United States Patent [19]

Tejima et al.

[11] Patent Number: 4,809,268

[45] Date of Patent: Feb. 28, 1989

[54] MULTIPOINT DATA COMMUNICATION WITH A SUPERVISORY SYSTEM FOR DETECTING A MALFUNCTIONING REMOTE STATION

[75] Inventors: Shunichiro Tejima; Akira Fujii, both of Tokyo, Japan

[73] Assignee: NEC Corporation, Japan

[21] Appl. No.: 101,727

[22] Filed: Sep. 28, 1987

[30] Foreign Application Priority Data

Sep. 30, 1986 [JP] Japan .................. 61-233062

[51] Int. Cl.$^4$ .............. H04J 3/24; H04J 3/16
[52] U.S. Cl. ........................ 370/93; 370/13; 370/96
[58] Field of Search ............ 370/93, 95, 104, 13, 370/110.1, 96, 90; 340/825.08, 825.06, 825.54

[56] References Cited

U.S. PATENT DOCUMENTS

| | | | |
|---|---|---|---|
| 4,167,730 | 9/1979 | Brown | 340/825.08 |
| 4,653,049 | 3/1987 | Shinmyo | 370/95 |
| 4,654,656 | 3/1987 | Deaver et al. | 340/825.08 |
| 4,672,608 | 6/1987 | Ball et al. | 370/93 |

*Primary Examiner*—Douglas W. Olms
*Assistant Examiner*—Wellington Chin
*Attorney, Agent, or Firm*—Laff, Whitesel, Conte & Saret

[57] ABSTRACT

A random access multipoint data communication system comprises a central station and a plurality of remote stations. A multiple access channel is established from the remote stations to the central station and a broadcast channel is established from the central station to the remote stations. The central station generates a timing signal for causing each of the remote stations to define commonly shared time slots on the multiple access channel. Each remote station transmits data on a randomly determined time slot of the multiple access channel. The central station periodically and sequentially interrogates the remote stations to return an acknowledgment and processes the returned acknowledgements to determine the presence of a malfunctioning remote station. To avoid data collision, the central station specifies an idle time slot on which the interrogated remote station is requested to send the acknowledgment.

3 Claims, 3 Drawing Sheets

REMOTE STATION

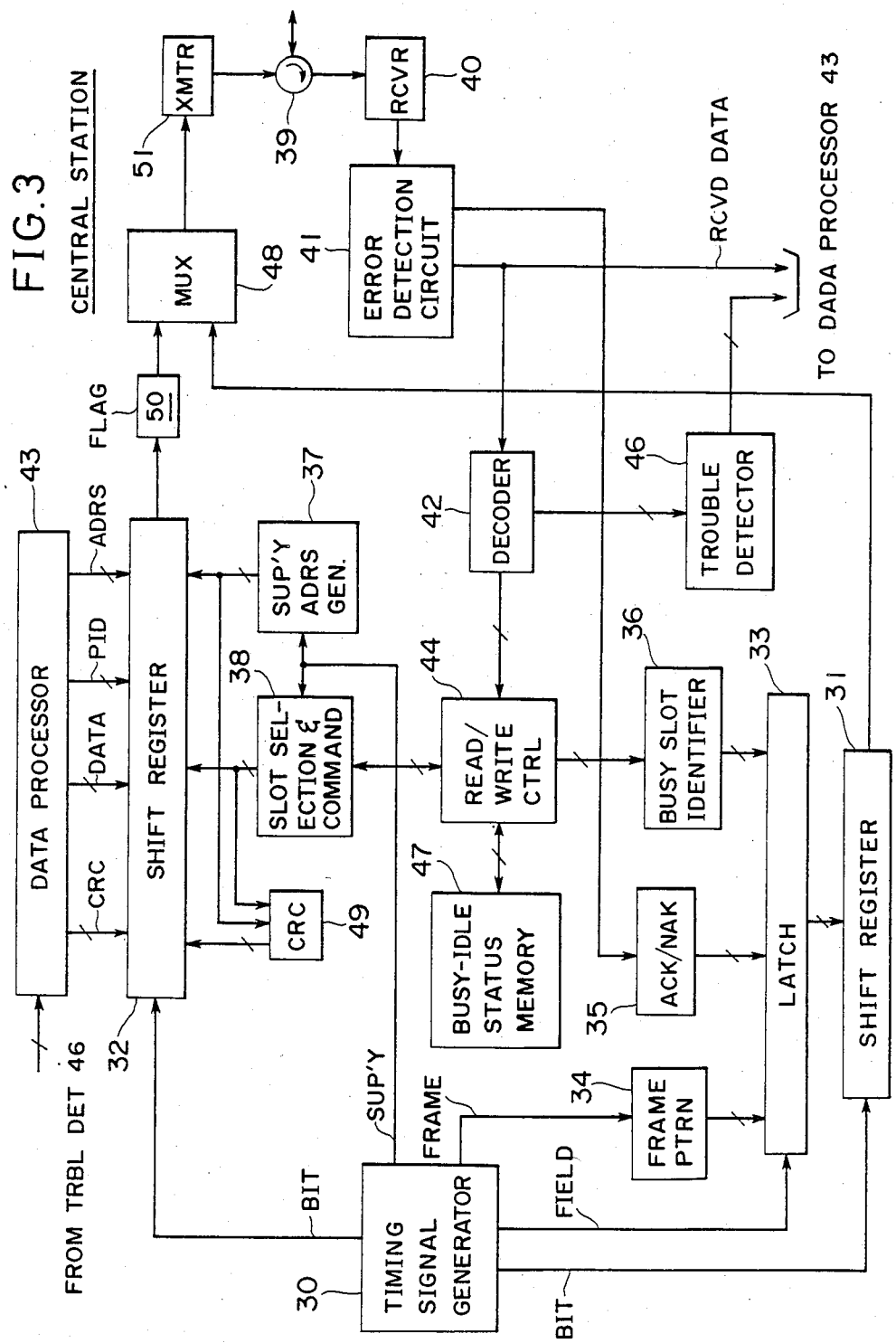
FIG. 3 CENTRAL STATION

MULTIPOINT DATA COMMUNICATION WITH A SUPERVISORY SYSTEM FOR DETECTING A MALFUNCTIONING REMOTE STATION

BACKGROUND OF THE INVENTION

The present invention relates to random access multipoint data communication systems, and more specifically to a slotted ALOHA system in which packets from remote stations are randomly transmitted over predefined time slots.

The unslotted ALOHA system is the first random access multipoint satellite data communication system. This system uses a single radio channel which is shared by a plurality of remote stations. Whenever a remote station generates a packet, it transmits the packet on the common radio channel to a central station. Since more than one station may attempt to transmit a packet simultaneously, several transmissions may overlap. These overlapping transmissions are said to collide if any portion of two packets overlap. Whenever a collision occurs, random numbers are used to specify a period of time each conflicting station must wait before an attempt is made to gain access to the channel. To increase channel utilization, the slotted ALOHA system was proposed in which the channel is partitioned into equal time slots and each station only transmits a packet at the beginning of a slot. In this way overlapping transmissions are forced to completely overlap. This technique substantially doubles the maximum channel utilization of the unslotted ALOHA system.

Since the remote stations transmit their packets only if there is a need to transmit, the system has no way of knowing if there is a remote station incapable of transmitting no packets due to a trouble.

It is thus desirable that the data communication system of this type be capable of detecting which one of the remote stations is not functioning properly to allow necessary action to be taken as earl as possible.

SUMMARY OF THE INVENTION

It is therefore an object of the present invention to provide a random access multipoint data communication system having a supervisory function that monitors the operating conditions of remote stations to detect a trouble in any of the remote stations.

Specifically, in the random access multipoint data communication system a multiple access channel is established from each of the remote stations to the central station and a broadcast channel is established from the central station to the remote stations. The central station generates a timing signal so that each of the remote stations can define time slots on the multiple access channel, and each of the remote stations transmits a packet on a randomly selected time slot on an "as needed" basis. The central station periodically and sequentially interrogates the remote stations to return an acknowledgment packet. According to the invention, the central station processes the acknowledgments and determines whether there is a trouble in any of the remote stations. To avoid collision between a supervisory acknowledgement packet and a data packet, the central station preferably specifies an idle time slot on which each of the interrogated remote stations is requested to send the acknowledgment packet.

BRIEF DESCRIPTION OF THE DRAWINGS

The present invention will be described in further detail with reference to the accompanying drawings, in which:

FIG. 3 is a block diagram of the central station; and

DETAILED DESCRIPTION

Figure 1:
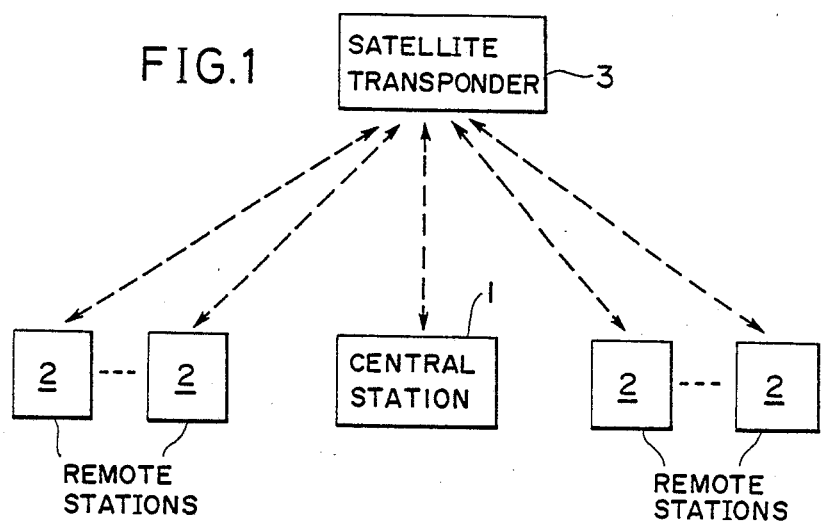
FIG. 1 is a view of the network architecture of a random access multipoint data communication system.

As schematically represented in FIG. 1, a typical example of the random access multipoint packet communication system comprises a central station 1 and a plurality of remote stations 2. Remote stations send packets on time slots defined by the central station 1 through a satellite transponder 3 to the central station, which returns packets through the transponder 3 to all the remote stations in a broadcast mode. As will be described, each of the remote stations is periodically interrogated by the central station to return a supervisory acknowledgment packet for monitoring purposes.

Figure 2A:
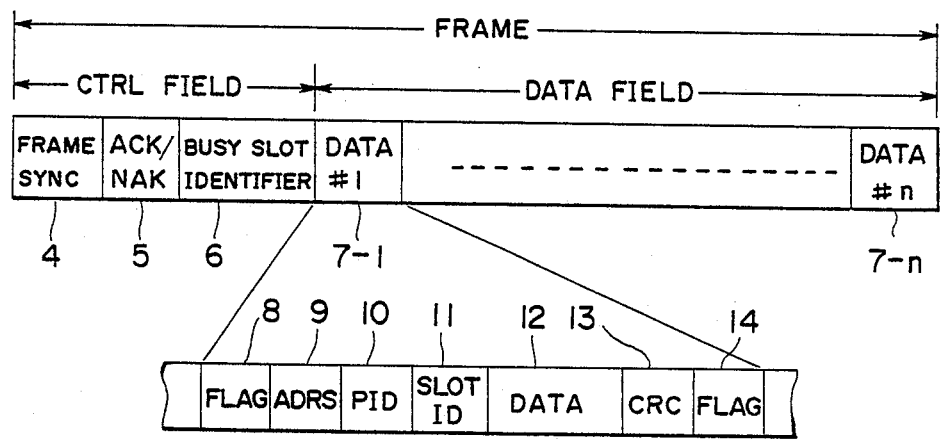
FIG. 2A is an illustration of a packet format of the central station.

FIG. 2A shows a packet format of the central station 1. As illustrated, packets are transmitted in a consecutive series of frames each being partitioned into a control field and a data field. The control field is composed of a frame sync subfield 4, a positive and negative acknowledgment (ACK/NAK) subfield 5 and a bus slot identifier subfield 6. The data field is composed of data slots 7-1 through 7-n, each comprising a starting flag subfield 8, destination address subfield 9, packet identifier subfield 10, slot identifier subfield 11, data subfield 12, CRC (cyclic redundant check) subfield 13 and a closing flag subfield 14. Each data slot is a message packet if it contains a message signal in the data subfield 12 or a supervisory polling packet if it contains a supervisory command signal in the data subfield 12. In the case of a message packet, the address of a destination remote station to which it is being sent is written into the address subfield 9, and some message packets include a link-level supervisory frame in the data subfield 12 to request a response from the destination remote station. In the case of a supervisory polling packet, the address of a remote station which is interrogated is written into the address subfield 9 and a slot number is written into the slot identifier subfield 11 specifying an idle time slot in which the interrogated station must return a supervisory acknowledgment packet. The rest of the remote stations examines the data given in the slot identifier subfield 11 and recognizes that the time slot which has been specified is just rendered busy and seeks other idle slots if there is a need to transmit. Packet identifier subfield 10 is examined by the remote stations to allow discrimination between message packets and supervisory polling packets.

Figure 2B:
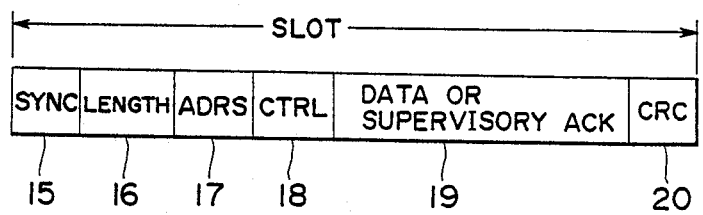
FIG. 2B is a packet format of the remote stations.

A packet from each remote station is formatted as shown in FIG. 2B. Each packet begins with a sync subfield 15 followed by a length subfield 16 indicating the length of the packet, an address subfield 17 containing the address of the source remote station from which the packet is transmitted, a control subfield 18, a data or supervisory acknowledgment subfield 19 and a CRC subfield 20. The packet from the remote stations is a data packet if it contains a message signal in the subfield 19 or a supervisory acknowledgment packet if it contains a supervisory acknowledgment signal in the subfield 19.

Referring to FIG. 3, the central station 1 comprises a timing signal generator 30 that generates various timing pulses including bit timing, field timing, frame timing and supervisory timing pulses. The bit timing pulse is supplied to shift registers 31 and 32, and the field and frame timing pulses are supplied to a latch 33 and a frame pattern generator 34, respectively. Shift register 31 is connected to latch 33 for reading a frame sync pattern from frame pattern generator 34, reading an ACK/NAK (positive or negative acknowledgment) pattern from an ACK/NAK generator 35 and for reading a slot identifier from a busy slot identifier circuit 36. The supervisory timing pulse is supplied to a supervisory address generator 37 to cause it to periodically increment a destination address count. This destination address count is supplied to shift register 32 to sequentially interrogates the remote stations. The supervisory timing pulse is also applied to a slot selection and command circuit 38 to cause an idle time slot to be selected and the identification of the selected time slot together with a supervisory polling command signal to be supplied to shift register 32. The command signal directs the interrogated remote station to return a supervisory acknowledgment packet on the selected time slot to avoid collision with a data packet from other remote stations.

Packets received from the remote stations are passed through duplexer 39 and receiver 40 to an error detection circuit 41 where packets in error are corrected using the CRC decoding technique. Error-checked packets are fed to a decoder 42 and to a data processor 43. The result of the error detection is supplied to ACK/NAK generator 35 so that ACK or NAK is supplied to latch 33 in the absence or presence of an error, respectively.

Decoder 42 examines the control field 18 of each received packet and supplies a source remote station address contained in the address subfield 17 to read-/write controller 44. The source station address is also supplied from decoder 42 to a trouble detector 46 together with information contained in the data/ACK subfield 19 of the received packet if the control subfield 18 indicates the presence of a supervisory acknowledgment signal in the subfield 19.

Busy-idle status memory 47 stores busy-idle status of all the time slots which are available for remote stations 2. Slot selection and command circuit 38 is associated with the read/write controller 44 to read the stored contents from the memory 47 to select an idle time slot in response to a supervisory timing pulse supplied from the timing signal generator 30 and causes the read/write controller 44 to rewrite the busy-idle status of the selected time slot. Busy slot identifier circuit 36 is connected to the read/write controller 44 to read the stored contents from the memory 47 and supplies the shift register 31 with a list of busy slot identifiers.

Information to be contained in the subfields 4, 5 and 6 of the control field are stored into the latch 33 and transferred to the shift register 31 in response to a field timing pulse from the timing signal generator 30 and clocked out of the shift register 32 through flag generator 50 into a multiplexer 48 in response to bit timing pulses.

Data processor 43 generates information to be contained in each of the data subfields 7 of a data packet by organizing it with a destination address (ADRS), packet identifier (PID), data bits (DATA) and CRC code and supplies the packet to the shift register 32. On the other hand, the information to be contained in the subfields 9 through 12 of a supervisory polling packet are organized by the outputs of supervisory address generator 37 and slot selection and command circuit 38 and a CRC code of the supervisory polling packet supplied from a CRC generator 49 which is associated with the supervisory address generator 37 and slot selection and command circuit 38. A flag generator 50 generates a flag pattern for insertion to the starting and closing flag subfields 8 and 14. Shift register 32 is supplied with data from the data processor 43 when transmitting a data packet or supplied with supervisory command data from the circuits 37, 38 and 49 when transmitting a supervisory polling packet. The contents of the shift register 32 are clocked out in response to bit timing pulses through the flag generator 50 to the multiplexer 48, the output of which is connected through transmitter 51 to duplexer 39.

Figure 4:
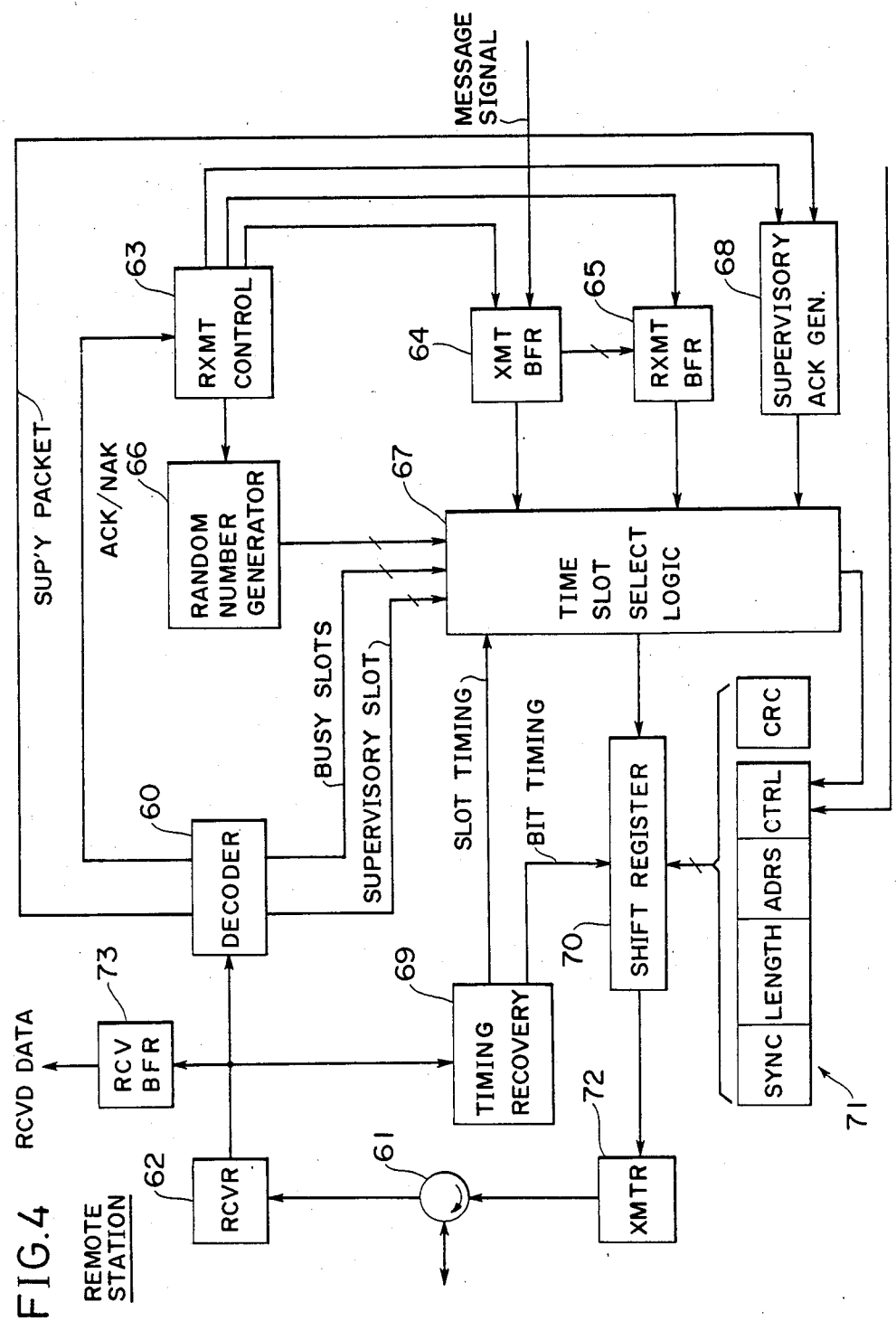
FIG. 4 is a block diagram of each remote station.

Referring to FIG. 4, each remote station receives packets from the central station through duplexer 61 and receiver 62. A decoder 60 is provided to detect a frame sync in the subfield 4 and examines its control and data fields. Specifically, if the ACK/NAK subfield 5 contains a negative acknowldgment (NAK) indicating that a data or a supervisory acknowledgment packet from the own remote station has been detected as being in error, the decoder 60 communicates this fact to a retransmit controller 63 to cause it to enable a retransmit buffer 65 to transmit a copy of the data packet and disable a transmit buffer 64 to prevent it from transmitting a data packet, if any, or communicates this fact to a supervisory acknowledgment packet generator 68 to cause it to retransmit a packet. For performing the retransmission of a data or a supervisory acknowledgment packet, a random number generator 66 is used by the retransmit controller 63 to specify a period of time conflicting remote stations must wait before an attempt is made to transmit a copy of data packet and supplies a signal indicative of the specified time period to a time slot select logic 67. The information contained in the busy slot identifier subfield 6 indicates the time slots which are busy. Time slot select logic 67 uses this busy status information to randomly select an idle time slot for transmitting a data packet from the transmit buffer 64 whenever an initial attempt is made on that packet to gain access to the channel.

If the information contained in the address subfield 9 of a data slot 7 matches the address of the own station, the decoder 60 examines the slot identifier subfield 11 and data subfield 12. If the data slot 7 being examined is a supervisory polling packet, the decoder 60 detects in the subfield 11 a slot number specified by the central station and examines the supervisory command signal in the data subfield 12 to recognize that it must send a supervisory acknowledgment packet on the specified time slot. Decoder 60 notifies the specified slot number to time slot select logic 67 and enables the supervisory acknowledgment packet generator 68 to send an acknowledgment signal to time slot select logic 67.

A timing recovery circuit 69 is connected to the output of receiver 62 to recover the bit and slot timing pulses and supplies the bit timing pulse to a shift register 70 to which the output of time slot select logic 67 is connected. The slot timing pulse is applied to the time slot select logic 67 to define time slots and transmit each packet at the beginning of a defined idle time slot which is randomly selected. A packet header/trailer generator 71, connected to the shift register 70, generates the necessary information to be inserted to the sync, length, address, control and CRC fields 15 to 18 and 20. Shift register 70 combines the header and trailer information of a transmit packet with the information supplied from the transmit and retransmit buffers 64, 65 and acknowledgment packet generator 68. The output of shift register 70 is connected through transmitter 72 to duplexer 62. A receive buffer 73 is connected to the receiver 62 to feed received data to a data terminal, not shown.

In operation, the central station 1 is constantly transmitting frames in the form of FIG. 2A to permit the remote stations to send data packets on randomly selected time slots using the information contained in the busy slot identifier subfield 6. Supervisory polling packets are inserted to the data field at periodic frame intervals in response to supervisory timing pulses generated by the timing signal generator 30. On detecting a supervisory polling packet addressed to a given remote station, the decoder 60 of that remote station enables the supervisory acknowledgment generator 68 to generate an acknowledgment signal, rewrites the control subfield 18 to indicate that the data slot is a supervisory acknowledgment packet and causes the time slot select logic 67 to feed the acknowledgment signal to the shift register 70 so that it is inserted to the data subfield 19 of a time slot which is specified in accordance with the slot identifier subfield 11 of the supervisory polling packet.

A message signal from each remote station is initially supplied from the associated data terminal to the transmit buffer 64. Time slot select logic 67 constantly monitors the busy slot identifier subfield 6 of each frame from the central station and selects an idle time slot in response to the generation of the message signal. The message signal is read from the transmit buffer 64 by the time slot select logic 67 into the shift register 70 and inserted to the data subfield 19 of the selected time slot while at the same time it is transferred to the retransmit buffer 65.

On receiving a supervisory acknowledgment packet, decoder 42 of the central station examines its subfields 18 and 19 and supplies the trouble detector 46 with the address of the interrogated remote station. Trouble detector 46 stores a record of the number of supervisory acknowledgment packets received from each of the remote stations for a unit period of time, determines that a trouble has occurred in a remote station if there is no responsive acknowledgment at all during the unit time period and communicates this fact to the data processor 43 to permit a necessary action to be taken or communicates this fact to the remote station of interest.

If the error detection circuit 41 detects an error in a received data or supervisory acknowledgment packet, it sends a NAK to the source remote station. Retransmit controller 63 of that remote station is informed of this fact and controls the transmit buffer 64 and retransmit buffer 65 or controls the supervisory packet generator 68 to transmit a copy of the previous packet on a time slot determined by the random number generator 66.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A random access multipoint data communication system having a central station, a plurality of remote stations, and means for establishing a multiple access channel from each of said remote stations to said central station and a broadcast channel from said central station to said remote stations, said central station comprising:
means for transmitting a timing signal to said remote stations via said broadcast channel;
means for transmitting a status signal indicating time slot idle-busy status to said remote stations via said broadcast channel;
means for sequentially transmitting on said broadcast channel to each of said remote stations a polling signal which is repeated at periodic intervals to request a polled remote station to return an acknowledgment signal on said multiple access channel, said polling signal specifying a time slot in said multiple access channel; and
means responsive to said acknowledgment signal for determining the presence or absence of a trouble in said polled station;

each of said remote stations comprising:
means responsive to said timing signal for defining a plurality of commonly shared time slots in said multiple access channel;
means for detecting said status signal to randomly select an idle time slot from among the time slots indicated by the detected status signal and for transmitting a message signal on said selected idle time slot; and
means for transmitting said acknowledgment signal in response to a receipt of said polling signal on a time slot of said multiple access channel specified by said polling signal.

2. A random access multipoint data communication system having a central station, a plurality of remote stations, and means for establishing a broadcast channel from said central station to said remote stations and a multiple access channel from said remote stations to said central station, said central station comprising:

means for transmitting on said broadcast channel a series of time frames, each of said time frames containing a timing signal, a time slot busy-idle status signal, and a series of message signals each bearing a destination address, a polling signal bearing a destination address, and a time slot identifier for specifying a time slot in said multiple access channel;

means for detecting an acknowledgement signal received from a remote station identified by the destination address contained in said polling signal and for determining the presence or absence of a trouble in the last-mentioned remote station;

each of said remote stations comprising:
means for defining a plurality of commonly shared time slots in said multiple access channel in accordance with said timing signal;
means for detecting said status signal to randomly select an idle time slot from time slots of said multiple access channel which are indicated by the detected status signal and for transmitting a message signal on said selected time slot;
means for detecting the destination address contained in each of said message signal and polling signal for enabling a remote station to identify its own address;

means for processing the message signal containing said detected destination address; and means for transmitting said acknowledgement signal in response to the polling signal containing said detected destination address on a time slot of said multiple access channel specified by the time slot identifier contained in the last-mentioned polling signal.

3. A method of communication between a central station and a plurality of remote stations, a broadcast channel for coupling said central station to said remote stations and a multiple access channel for connecting said remote stations to said central station, said central station communicating by a method comprising the steps of:
(a) transmitting a series of time frames on said broadcast channel, each of said time frames containing a timing signal, a time slot busy-idle status signal, and a series of message signals, each of said message signals bearing a destination address and a polling signal bearing a destination address, and a time slot identifier for specifying a time slot in said multiple access channel;
(b) detecting an acknowledgment signal received from a remote station identified by the destination address contained in said polling signal; and
(c) determining the presence or absence of trouble in the last-mentioned remote station;

each of said remote stations communicating by a method comprising the steps of:
(d) defining a plurality of commonly shared time slots in said multiple access channel in accordance with said timing signal;
(e) detecting said status signal to randomly select an idle time slot from among the time slots of said multiple access channel which are indicated by the detected status signal;
(f) transmitting a message signal on said selected time slot;
(g) detecting the destination address contained in each of said message signal and the polling signal for enabling a remote station to identify its own address;
(h) processing the message signal containing said detected destination address; and
(i) transmitting said acknowledgment signal in response to the polling signal containing said detected destination address via a time slot of said multiple access channel which is specified by the time slot identifier contained in the last-mentioned polling signal.

* * * * *

UNITED STATES PATENT AND TRADEMARK OFFICE
CERTIFICATE OF CORRECTION

PATENT NO. : 4,809,268

DATED : February 28, 1989

INVENTOR(S) : Tejim and Fujii

It is certified that error appears in the above—identified patent and that said Letters Patent is hereby corrected as shown below:

Delete Figs. 3 and 4 which appear on sheet 2 of 3 in this patent application and substitute therefore the Fig. 4 attached hereto.

Signed and Sealed this

Twenty-seventh Day of February, 1990

*Attest:*

JEFFREY M. SAMUELS

*Attesting Officer*     *Acting Commissioner of Patents and Trademarks*

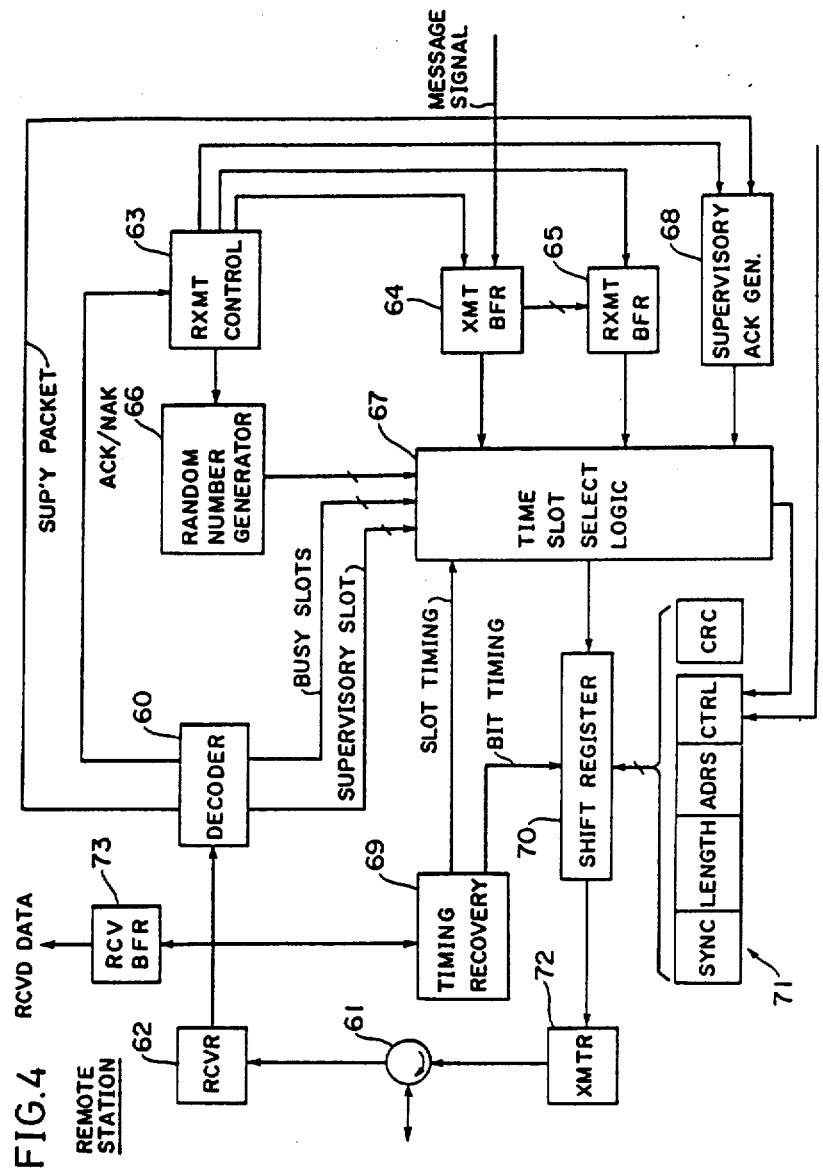
FIG.4 REMOTE STATION